United States Patent
Blincoe et al.

(10) Patent No.: US 9,799,007 B2
(45) Date of Patent: Oct. 24, 2017

(54) METHOD OF COLLABORATIVE SOFTWARE DEVELOPMENT

(71) Applicants: Kelly Coyle Blincoe, Jeffersonville, PA (US); Giuseppe Valetto, Turin (IT)

(72) Inventors: Kelly Coyle Blincoe, Jeffersonville, PA (US); Giuseppe Valetto, Turin (IT)

(73) Assignee: Drexel University, Philadelphia, PA (US)

( * ) Notice: Subject to any disclaimer, the term of this patent is extended or adjusted under 35 U.S.C. 154(b) by 431 days.

(21) Appl. No.: 14/462,387

(22) Filed: Aug. 18, 2014

(65) Prior Publication Data

US 2016/0048805 A1 Feb. 18, 2016

(51) Int. Cl.
  *G06F 7/00* (2006.01)
  *G06F 17/00* (2006.01)
  *G06Q 10/10* (2012.01)

(52) U.S. Cl.
  CPC .................. *G06Q 10/101* (2013.01)

(58) Field of Classification Search
  None
  See application file for complete search history.

(56) References Cited

U.S. PATENT DOCUMENTS

| | | | | |
|---|---|---|---|---|
| 2009/0276752 | A1* | 11/2009 | Sharma | G06F 8/20 717/103 |
| 2011/0106850 | A1* | 5/2011 | Li | G06F 17/30699 707/780 |
| 2011/0252394 | A1* | 10/2011 | Sharma | G06F 11/3616 717/101 |
| 2014/0006042 | A1* | 1/2014 | Keefe | G06F 19/363 705/2 |
| 2014/0137074 | A1* | 5/2014 | Hey | G06Q 10/063112 717/101 |

* cited by examiner

Primary Examiner — Tuan A Pham
(74) Attorney, Agent, or Firm — Dunlap Bennett & Ludwig PLLC

(57) ABSTRACT

A method of collaboratively developing software includes recording a plurality of developers' tasks relating to a collection of software development files via software executing on a computer. The method further includes calculating a proximity score between a plurality of tasks based on the overlap of the developers' activities via software executing on a computer. The method further includes selecting and capturing a group of task properties that along with the proximity score can be used to select a group of task pairings that require coordination. The method further includes notifying the developers assigned to the task pairings selected that they may need to coordinate their development efforts.

4 Claims, 3 Drawing Sheets

METHOD OF COLLABORATIVE SOFTWARE DEVELOPMENT

TECHNICAL FIELD

The method described herein relates to the field of software development, more particularly, to the field of collaborative software development.

BACKGROUND

Tight coordination is required among development team members in order to deliver a successful software system. Unfortunately, there are several problems inherent in software development projects that make such coordination difficult. Several software characteristics—scale, interdependence, and uncertainty—cause unavoidable coordination problems.

Software systems are becoming increasingly large, thus making complexity and interdependencies between modules of software systems particularly significant characteristics. Often, projects involve millions of lines of code and the development cycle spans multiple years. The size of these projects makes it impossible for any one individual or even a small group of individuals to fully understand all details of the system being developed. When projects become large, it is necessary to divide the development work among several teams of developers. This can create efficiency by allowing teams to work in parallel. However, parallel streams of work must eventually be integrated, which introduces additional coordination needs. Moreover, developers are often separated by geographic, organizational or social boundaries, and these boundaries can create coordination barriers.

Software that has been broken into small components to be developed independently by many teams or developers must eventually be integrated into one deliverable software system. There are often many dependencies between the various components. In order for the end system to function correctly, the components must work together properly. Integration of software must be very precise. Lack of coordination among developers working on dependent components can lead to integration problems.

Software development work is subject to continuous change, That causes many difficulties and produces ongoing coordination needs. Requirements can change over time due to changes in user needs, hardware changes or changing business needs.

These characteristics are inherent in modern software projects and introduce coordination overhead. While steps can be taken to reduce this coordination overhead, the need to coordinate cannot be completely eliminated in any project. Adding more people to project that is already behind schedule further delays the project due to the added project coordination and communication overhead. Coordination can be even more difficult when the involved developers span team boundaries. When cross-boundary dependencies exist, developers often do not coordinate due to a lack of awareness of the importance of the coordination as well as a lack of social relationships across teams. Lack of coordination results in integration problems. Coordination is one of the biggest problems in large software projects. Developers are not always aware of their coordination needs and when developers are unaware of the coordination that is required to manage their work dependencies, problems occur. Studies have found that unfulfilled coordination needs can result in an increase in task resolution time, an increase in software faults, build failures, redundant work, and schedule slips.

Some researchers have developed methods of determining when individual coders should coordinate but the need to coordinate is only identified at the coder level. For example, coder A should coordinate with coder B. Since both coders A and B are usually involved in multiple tasks, this level of information is not actionable. The specific task-pair that they need to coordinate is the required information.

Most software engineering work is done as "tasks." Tasks are defined as a work assignment given to a specific coder. For example, a task may be to add a certain user requested function to the overall system, or it may be to fix an error that occurs when the system is used. Therefore, a task typically involves multiple files (or artifacts) of the overall system. The task may involve editing certain files, looking at certain files without editing (to make sure that the change in one file will not cause problems in others) or it may involve the creation of new files.

To be actionable, coordination requirements must be identified at the task-pair level of detail. However, if every potential pair of tasks was identified as requiring coordination, information overload would prevent effective coordination. The example of the healthcare.gov website with its 500 million lines of code can shed some light on this potential information overload. Several thousand coders were/are involved in the development of this software system. The number of task-pairs that could potentially require coordination is in the multiple-billions. Therefore, in order to assure that the critical coordination requirement needs are identified, a means to identify those that are critical is required in real time.

Awareness of coordination needs is a critical concern in large software projects. However, too many coordination requirements is the same as having no coordination requirements identified as the information overload causes the alerts to be ignored by software engineers. Thus, any coordination system should have high specificity as well as high sensitivity.

There is a need in the art for a development coordination system that can identify dependencies and coordination needs with high specificity and sensitivity.

Existing configuration management systems attempt to manage coordination requirements but they are limited in that they only manage direct conflicts. That is, the configuration management system will prevent two software engineers from working on the same file of code at the same time. Or, the configuration management system will allow parallel work on the same file and attempt to merge the changes when both engineers are completed their work. However, if code file X has a dependency on code file Y, the configuration management system will not be able to identify the need for engineers to coordinate their work when these files are simultaneously edited.

BRIEF SUMMARY

A method of collaboratively developing software includes recording a plurality of developers' task activities relating to a collection of software development files via software executing on a computer. The method further includes calculating a proximity score between a plurality of tasks based on the overlap of the developers' activities via software executing on a computer. The method further includes identifying properties associated with each code file being worked on in a particular task. These task properties (such as software architectural properties, intended hardware host, operating system, etc.) are used along with the proximity score as input to an algorithm that selects the task parings that require coordination. The method further includes notifying the developers assigned to the task pairings selected that they need to coordinate development.

In some embodiments, the developers' activities include viewing and selecting files. In some embodiments, the method further includes: collecting information about software architecture, operating system, or hardware; selecting a group of task pairings based on the information collected; and selecting developers to be notified based on the groups selected. In some embodiments, other characteristics of the software files involved in a specific task may be collected to further refine the sensitivity of the coordination requirements between different task pairs.

In some embodiments, the method further includes: querying the plurality of developers' task related information on which entities require collaborating and the degree to that collaboration; selecting a group of task pairings based on the information collected. This information is then used to train a machine learning algorithm to differentiate between task parings that do or do not require coordination. In lieu of querying the plurality of developers, software architects with historical knowledge of the software system to which the invention is being applied can develop the data required to train the algorithm.

In some embodiments, the method further includes periodically repeating the method to iteratively improve efficacy of the method. In some embodiments, the proximity score between two tasks is calculated based on the following weights: 1 if a common file was edited by developers conducting both tasks; 0.59 if a common file was viewed by developers conducting both tasks; and 0.79 if a common file was viewed by a developer conducting one task and edited by a developer conducting the other task. In some embodiments, the proximity score between two tasks is calculated by summing the weighted instances of common file viewing and/or editing between developers conducting different tasks. In some embodiments, the threshold is a proximity score equal to or greater than the mean+2 standard deviations. In some embodiments, the selection is based on a machine learning algorithm.

DETAILED DESCRIPTION

Figure 1:
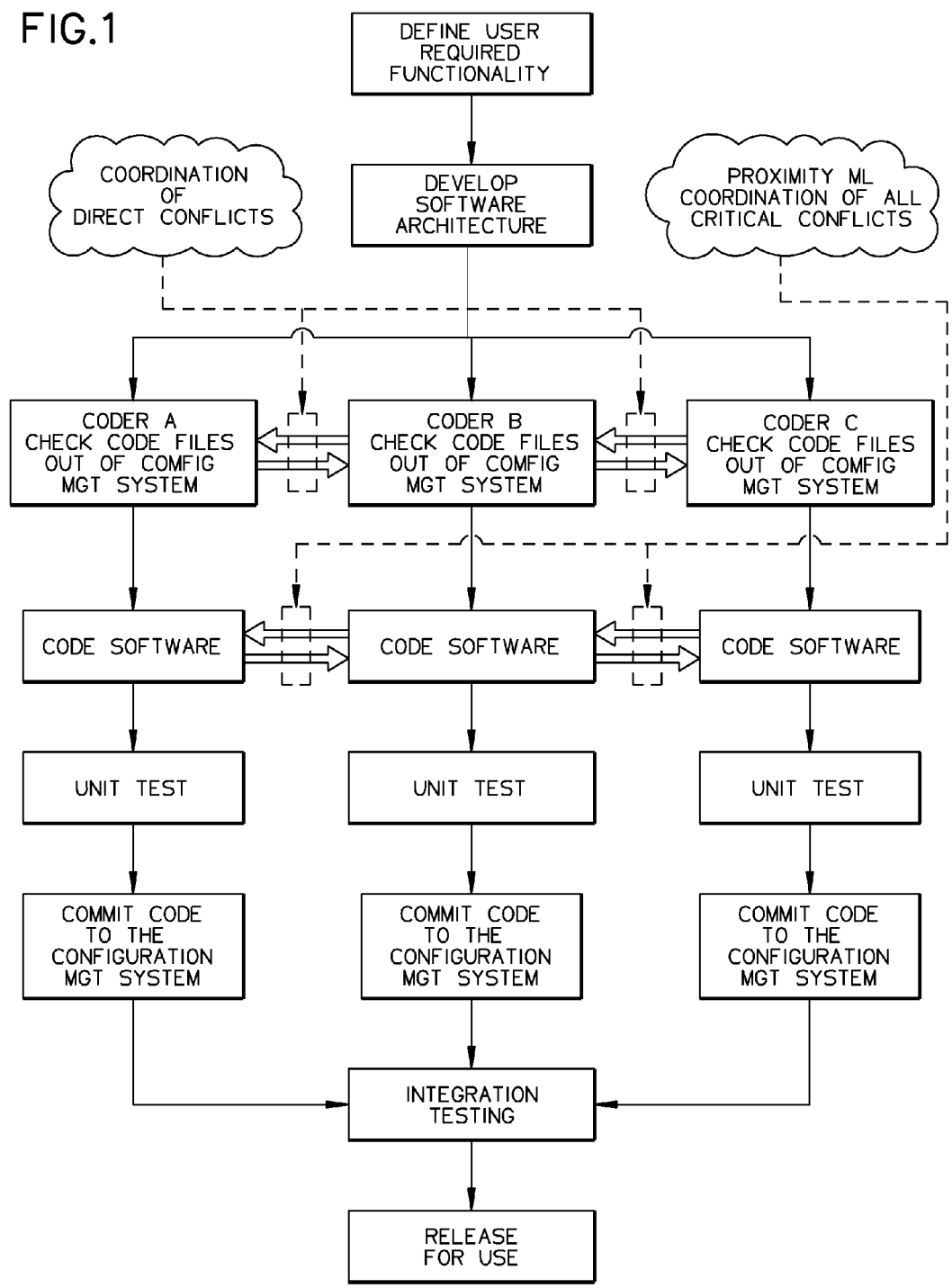
FIG. 1 is a block diagram of the method according to one embodiment.

The system and method described herein identify the "proximity" of each developer's specific tasks to the other developers' specific tasks to determine the extent and nature of their need to coordinate specific task pairings. A proximity score is calculated using the numbers of selects and edits that various users have made to the software development files.

Proximity is a metric for measuring coordination needs in software development teams. Unlike more traditional coordination requirement detection techniques, it does not obtain information from the source control repository system. These differences make proximity timely and turn coordination requirements into an actionable concept for managing coordination in software projects.

To determine coordination requirements, the proximity algorithm examines the similarity of artifact (code files) working sets as they are constructed during developers' tasks. To do this, it obtains developer actions such as artifact consultation or edits as they occur. To fulfill its own purposes, it records developer activities as they occur. These events are stored as context data for the task in focus.

The proximity measure looks at artifact consultation and modification activities captured and weighs the overlap that exists between the working sets associated with other tasks of all developers working on the involved software system. It considers all actions recorded for each artifact in each working set in order to apply a numeric weight to that artifact's proximity contribution. Weights are applied based on the type of overlap where the most weight is given when an artifact is edited in both working sets (weight=1) and the least amount of weight is given when an artifact is simply consulted in both working sets (weight=0.59). When an artifact is edited in one working set and consulted in the other working set, we consider this a mixed overlap (weight=0.79). The calculation of proximity in this manner is referred to as the actual overlap between a specific task pairing.

For each task paring, a maximum potential proximity score is also calculated. The maximum potential proximity score is the union of all files involved in the two tasks of a task pairing. Each file is assumed to have been edited in both tasks. Therefore each file is given a sore of 1.0 and the maximum potential proximity score is therefore the count of all the files involved in the task pair.

The proximity score for a specific task pair is then calculated as the ration of the actual overlap versus the maximum potential overlap. Since this is a ratio, the proximity score for a given task pair must be equal to or less than 1.0. Higher proximity scores are indicative of a stronger need to coordinate.

The system enables coordination of all critical conflicts by proactively monitoring the activities of each individual coder as they perform their tasks and comparing the activities of one coder's specific task against the activities of all other coders' specific tasks (proximity scoring). In addition, the architectural features of the software system are also leveraged to determine coordination requirements.

Although configuration management systems focus on files, most software engineering work is done as "tasks." Tasks are defined as a work assignment given to a specific coder. For example, a task may be to add a certain user requested function to the overall system, or it may be to fix an error that occurs when the system is used. Therefore, a task typically involves multiple files of the overall system. The task may involve editing certain files, looking at certain files without editing (to make sure that the change in one file will not cause problems in others) or it may involve the creation of new files.

Upon completion of work, coders "commit" their changes (the new and/or edited files) in the configuration management system and when enough of the system (or sub-system) is sufficiently complete, the "integrated" modules are tested in what is known as an integration test. If coordination requirements were missed during the coding effort, errors are usually (but not always) found during the integration testing. If errors are found, rework that could have been avoided is required. If errors exist but are not detected during integration testing, the end user will eventually find the error.

The development of software (coding) is performed using an "Integrated Development Environment" (IDE). IDEs include text editors that allow coders to view, write and or edit their individual files of software, to "unit test" their completed work, and to submit their completed work to the project's overall configuration management system. Some IDEs keep track of the coders' activities at the task level. For example, metrics regarding which files are viewed and/or edited are available for each task a coder is working on. This information can be captured in real time to compare with the activities of other coders and used as an input to developing coordination requirements.

In one embodiment of the system and method, the IDE is used to capture task level data on file edit and views. In another embodiment of the system and method, separate tracking of the software engineer's activities is performed by the system and method.

The system described herein leverages all the known information regarding software engineering tasks so that real time critical coordination requirements can be identified. The identification of the critical coordination requirements at the task level makes the information generated by the system actionable.

Unlike any system or research done to date, this system not only identifies direct conflict coordination requirements (working on the same software file) but it also determines indirect conflict (file X depends on file Y) coordination requirements at the task level of detail (by using file view metrics and software architectural properties). And, it is done in a timely manner that makes the information actionable by the coders as they complete their tasks. Coordination requirements at the task level rather than at the developer level have never been predicted before.

The system leverages information of the coders' activities, the known properties of the files involved in the coders' tasks, and machine learning to determine critical coordination requirements. The "known properties" can include; the hardware the software is running on, the operating system the software is running on, and the software architecture itself. Even software systems that do not have an architecture diagram have a planned (or evolved) architecture. In cases where an architecture diagram is not available, there is usually an expert that understands the breakdown of the software modules and how work can be segregated to minimize overlap and coordination conflicts. This knowledge can be translated into a defined architecture diagram for use in executing the method. The system is intended for use on large scale software systems that could not be sustained without defined software architecture.

In once embodiment of the method the software architecture is defined using a Design Rule Hierarchy (DRH) that identifies technical dependencies between software modules. Theoretically, independent software modules can be worked on in parallel without incurring coordination overhead. A DRH clusters modules into "layers" where each layer depends only on the layers above. The layers can be used to differentiate modules that represent influential design decisions (design rules) from low-level modules that depend on those decisions. The DRH establishes three categories of work that can be used to differentiate between tasks that can be completed independently and those that will require coordination:

1. Same Layer Same Module (SLSM) pairs: Two tasks include edits to files that have a dependency and are in the same module. Tasks that have a SLSM relationship may require coordination.
2. Across Layer (AL) pairs: Two tasks include edits to files that have a dependency and are in different modules and different layers. Tasks that have an AL relationship may require coordination.
3. Same Layer Different Module (SLDM) pairs: Two tasks include edits to files that are in different modules of the same layer. By definition, there are no dependencies between these artifacts, so tasks with only SLDM relationships should be able to be completed independently.

The method captures the activities all individual tasks in real time including the files each coder selects to either edit or to view for a particular task. The file view/edit information is then leveraged to collect the following task-pair properties (note; properties may vary for different software systems):

Within same file
Within same platform
Within same operating system
Number of SLSMs
Number of ALs These properties are all known at the time work begins on each task and can be captured real time as work progresses. Therefore, by monitoring these metrics (or others that may better define a specific software system) critical potential coordination requirements can be identified in a timely manner. These potential coordination requirements can then be evaluated against a baseline set of "known parameters" to determine if the potential coordination requirement is sufficiently critical to alert the coders of the involved tasks requiring coordination. Thus, the coders are able to resolve the coordination requirement and prevent future rework or errors in the final software system.

SVM Machine Learning:

The properties decided upon for each software system are then used to create a baseline "region" of critical coordination requirements in a machine learning environment. This region is a multi-dimensioned space that correlates to the task-pair properties that define a task-pair as requiring or not requiring coordination. The system uses a Support Vector Machine (SVM) classification technique.

An SVM is a supervised machine learning classification algorithm. Given a training set, it produces a model that can be used to predict the classification of unknown instances given a set of known parameters of those unknown instances. The known parameters are historical task-pair properties with known coordination requirements (discussed later as the "Ground Truth").

To perform parameter selection, the machine learning SVM uses the RBF (radial basis function) kernel. It estimates the accuracy of each combination of parameters through cross validation (CV). The parameter combination with the highest CV score is selected. This defines the region of critical coordination requirements that can be used to identify future task-pair combinations that have critical coordination requirements. It also establishes a region of non-critical coordination requirements.

Ground Truth:

Capturing historical records of task-pairs properties and identifying if each task-pair had (or did not have) critical coordination requirements defines the set of "known parameters." A sample set of historical task-pairs is used to populate the machine learning SVM with "known parameters." Software projects may have historical data available on coordination requirements that were found through manual processes. If such information exists, it can be used as the starting point for the Ground Truth and be updated/maintained with new data as the method is implemented and new data is automatically generated and reviewed by the software architecture team.

The following process to establish Ground Truth is used in one embodiment:

Each task-pair of an entire release of a software product is scored for potential coordination requirements. This scoring considers the overlap of common files between the involved tasks. If a common file was edited in both tasks, a score of 1 is added, if a common file was viewed in both files a score of 0.59 is added, and if a common file was edited in one task and viewed in the other task a score of 0.79 is added. Since a task-pair can have multiple files in common, each overlap of events for all files in common is added in a cumulative fashion.

Those task pairs with a score equal to or greater than the mean+2 standard deviations are selected.

The selected task-pairs are manually coded using the following Coding Guidelines and selected those that had "somewhat" or "very" average scores as critical requirements. The final selection assures that about half of the task-pairs required coordination. Approximately 300 task-pairs may be included in the final set of "ground truth."

| Characteristic | No | Somewhat | Very |
|---|---|---|---|
| Task Discussion Similarity: Task discussions often include details of the task and any problems that have been encountered. The coders to rate the similarity of the discussions occurring on each task. | The discussions of the two tasks do not share any of the same concepts. | The two task discussions refer to common aspects of the system from the perspective of EITHER the user (system features) or the system architecture (specific reference to code, modules, etc.) OR The two task discussions indicate that the problems may be occurring in the same area of the code. | The two task discussions refer to common aspects of the system from the perspective of BOTH the user (system features) and the system architecture (specific reference to code, modules, etc.) The two task discussions refer to the same or |
| Evidence of Task Conflict: Task conflict is the epitome of a coordination need and often indications of conflicts exist in the task Discussions (explicitly or implicitly). The coders look for such evidence. | The discussion in the two tasks does not seem to indicate that the two tasks were conflicting in any way. | The discussion in one of the tasks does not explicitly mention a conflict between the two tasks. However, based on reviewing the timing of the tasks and their discussions, it seems there may have been a conflict between the two tasks that the team may not have been not aware of at the time. | It is apparent based on the timing of the tasks and the discussion thread that there was a conflict between the pair of tasks. The conflict is clearly discussed and may or may not explicitly link the two tasks by ID. |

The ground truth should be maintained on a periodic basis as the software evolves over time. For new software development projects, the system should be initiated as soon as the software architecture diagram is developed and task-pair properties should be collected from the day coding begins. In the case of new projects, ground truth will eventually develop. The establishment of ground truth will be indicated by the precision and recall of the algorithm.

Figure 2:
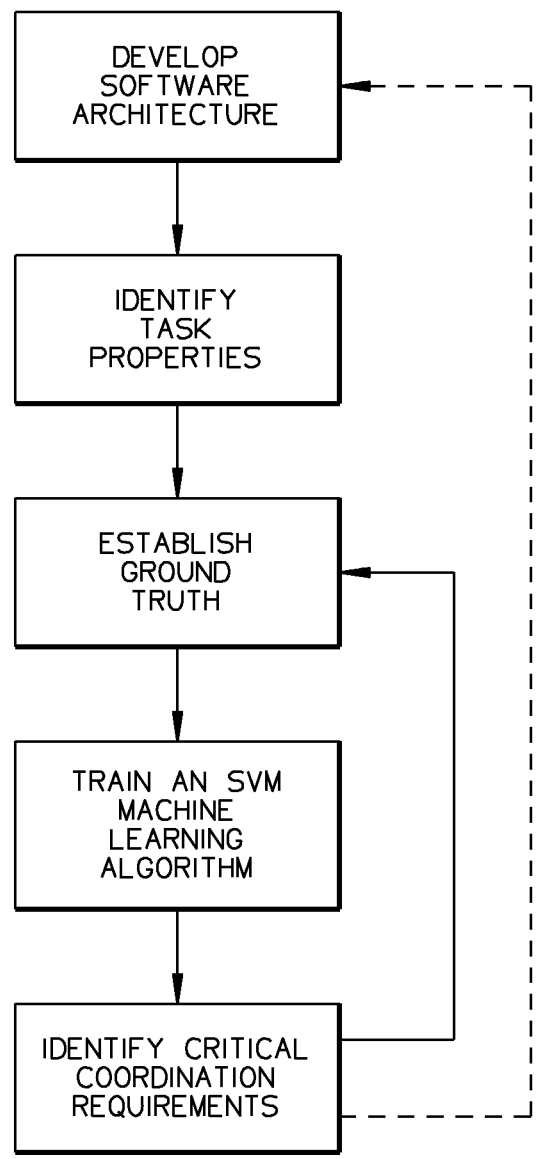
FIG. 2 is a block diagram of the embodiment of FIG. 1.

Referring to FIG. 2, the dashed line is helpful for the software engineering life cycle, but it is not necessary for the method.

Figure 3:
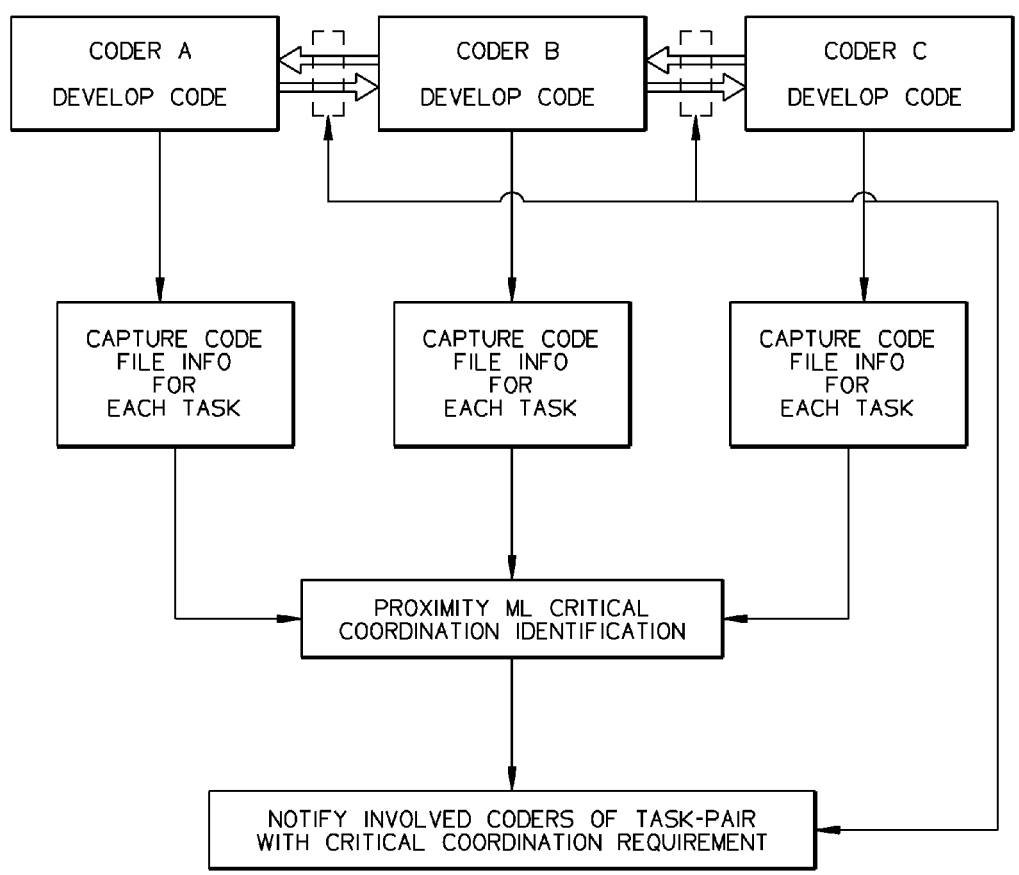
FIG. 3 is a block diagram of the embodiment of FIG. 1.

Another way to view the method is to replace the cloud near the top right of FIG. 1 with the process diagram in FIG. 3. This depicts how the method is integrated into the software development life cycle as part of the "Develop Code" activity.

Although the invention has been described with reference to embodiments herein, those embodiments do not limit the invention. Modifications to those embodiments or other embodiments may fall within the scope of the invention.

What is claimed is:

1. A method of collaboratively developing software, comprising:
   (a) recording a plurality of developers' tasks as the tasks occur via software executing on a computer, wherein the tasks comprise viewing and editing files;
   (b) determining an actual score between two tasks via software executing on a computer, wherein the actual score is determined by a weight comprising: a high amount of weight comprising 1 when a common file is edited in both tasks, a low amount of weight comprising 0.59 when the common file is viewed in both tasks, and a middle amount of weight comprising 0.79 when the common file is viewed in one task and edited in the other task;
   (c) calculating a score between the two tasks via software executing on a computer by dividing the actual score by a maximum potential score to produce a ratio, wherein the maximum potential score is a union of files between the two tasks that have been edited and/or viewed; and
   (d) determining the developers of the two tasks need to coordinate if the score exceeds a threshold score.

2. The method of claim 1, further comprising:
   (e) collecting information about code file software architecture, operating system, hardware, and/or other attributes associated with the involved software system prior to step (a); and
   (f) selecting the two tasks based on the information collected in step (e).

3. The method of claim 1, further comprising:
(e) querying the plurality of developers or system experts on which entities require collaborating and the degree to that collaboration;
(f) selecting the two tasks based on the information collected in step (e).

4. The method of claim 1, wherein the threshold in step (d) is a score equal to or greater than the mean+2 standard deviations.

\* \* \* \* \*

UNITED STATES PATENT AND TRADEMARK OFFICE
CERTIFICATE OF CORRECTION

PATENT NO. : 9,799,007 B2
APPLICATION NO. : 14/462387
DATED : October 24, 2017
INVENTOR(S) : Kelly Coyle Blincoe and Giuseppe Valetto It is certified that error appears in the above-identified patent and that said Letters Patent is hereby corrected as shown below:

In the Specification

Column 1, Line 4, please insert the following text --This invention was made with government support under Contract No. CCF-0916891 and VOSS OCI-1221254 awarded by the National Science Foundation. The government has certain rights in the invention.--

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*